April 27, 1965   L. D. ANDERSON   3,181,138
ELECTRICAL SOUND SIMULATOR
Filed Dec. 22, 1953   2 Sheets-Sheet 1

SOUND PRESSURE SIGNATURES

INVENTOR
L. D. ANDERSON

BY
ATTORNEYS

April 27, 1965 L. D. ANDERSON 3,181,138
ELECTRICAL SOUND SIMULATOR
Filed Dec. 22, 1953 2 Sheets-Sheet 2

INVENTOR
L. D. ANDERSON
BY
ATTORNEYS

United States Patent Office 3,181,138
Patented Apr. 27, 1965

3,181,138
ELECTRICAL SOUND SIMULATOR
Lloyd D. Anderson, Takoma Park, Md., assignor to the United States of America as represented by the Secretary of the Navy
Filed Dec. 22, 1953, Ser. No. 399,844
8 Claims. (Cl. 340—384)
(Granted under Title 35, U.S. Code (1952), sec. 266)

The invention described herein may be manufactured and used by or for the Government of the United States of America for governmental purposes without the payment of any royalties thereon or therefor.

This invention relates to a method for stimulating the pressure signature of a passing sound source and to apparatus for producing an analog of such a signature. More specifically, this invention discloses a new method of simulating the acoustic pressure signature of a sound source passing a point by producing an electrical signal having a voltage curve corresponding to the characteristic acoustical pressure curve, or signature, produced at that point by the source of sound moving past such a point. The invention also includes the disclosure of one form of apparatus which will produce a signal analogous to the acoustical pressure signature of a source of sound passing a point. This apparatus comprises a circuit which generates a voltage whose amplitude varies with time in a manner analogous to the required acoustical pressure signature. This voltage is used to modulate the output of a frequency generator covering the frequency range of the simulated acoustic pressure source.

Prior to this invention, when it became desirable to test devices which were selectively responsive to an acoustic pressure signature, such as acoustic mines, it was necessary to either make a sound recording of the actual passage of a sound source, such as a ship, or to simulate the signature by such means as non-linear potentiometers or linear potentiometers rotated at non-linear speeds. Such prior devices and methods involve elaborate equipment and procedures or require specially constructed potentiometers which are difficult to construct.

An important object of this invention is to provide an electrical analogue of a moving sound source.

Another object of the invention is to provide an electrical circuit having a voltage output varying in amplitude in the same manner as the acoustic pressure signature of a moving sound source.

A further object of the invention is to provide an electrical analogue pressure signature of a moving sound source from which may be derived an electrical signal simulating the acoustic signature, by varying the magnitude of the in-phase component of the voltage in an impedance circuit linearly and directly with time.

Still another object of the invention is to provide a method of simulating electrically the acoustic pressure signature of a sound source passing a fixed point.

Still a further object of the invention is to provide a circuit for simulating the noise of a passing sound source.

Other objects and many of the attendant advantages of this invention will be readily appreciated as the same becomes better understood by reference to the following detailed description when considered in connection with the accompanying drawings wherein.

Figure 1:
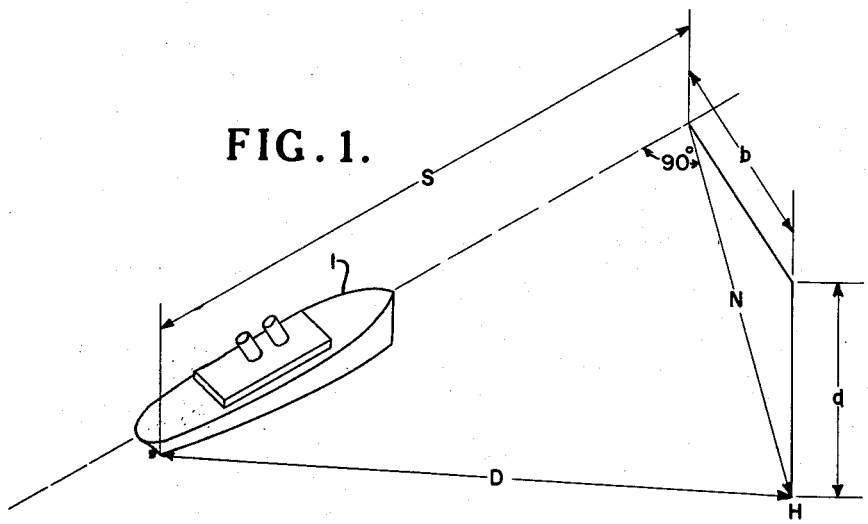
FIG. 1 is a vector diagram showing a vessel traversing an area adjacent a sound detector.

A more complete understanding of the invention may be obtained from the following detailed description:

Referring to FIG. 1, the mathematical formula for the acoustic pressure signature may be derived by considering the movement of a ship, 1, past a hydrophone, H, with the ship moving along line S with a speed P. The acoustical pressure of the sound source varies inversely as the distance from the source and can be represented to a sufficiently close approximation by the function $$V = \frac{K}{D} \qquad (1)$$

where:

V is the acoustic pressure signature
D is the radial distance of the source from the hydrophone
K is a constant of proportionality which is a function of the amplitude of the signature at the source.

From a consideration of the geometry of FIG. 1, it can be seen that $$D = \sqrt{S^2 + N^2} \qquad (2)$$

where:

S is the distance from the point of initial detection to the point of minimum distance from the hydrophone H and
N is the least distance of approach.

Also it may be noted that $$S = Pt$$

where:

P is the speed of movement of the sound source and
t is the time remaining from the source to reach the point of minimum distance.

Therefore, substituting in the equation for V gives $$V = \frac{K}{\sqrt{S^2 + N^2}} = \frac{K}{\sqrt{P^2 t^2 + N^2}} \qquad (3)$$

Figure 2:
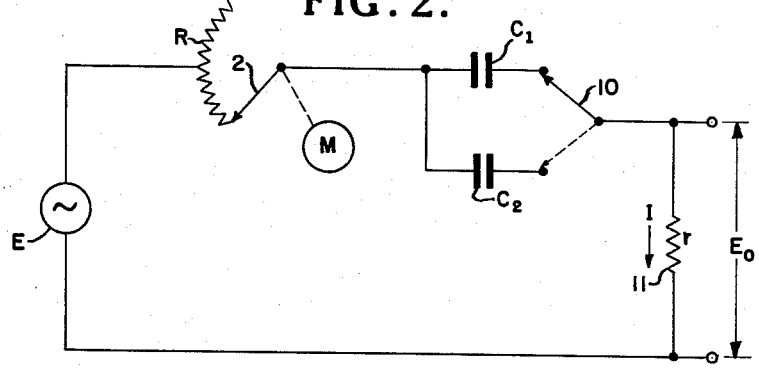
FIG. 2 is a schematic circuit diagram of an electrical analogue for simulating electrically the acoustic pressure signature of a moving sound source.
Figure 3:
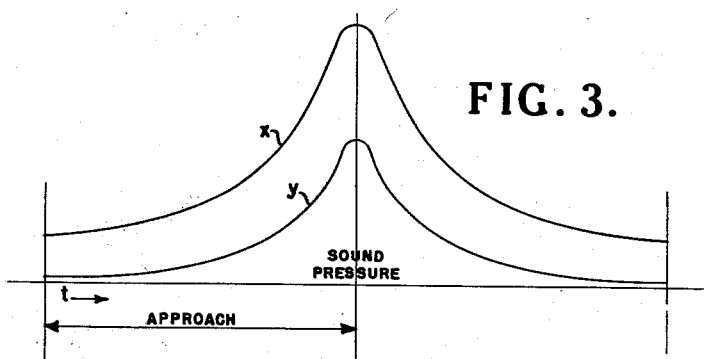
FIG. 3 shows the rectified and filtered fall-off curves of sound pressure signatures for two sound sources differing only in loudness.
Figure 4:
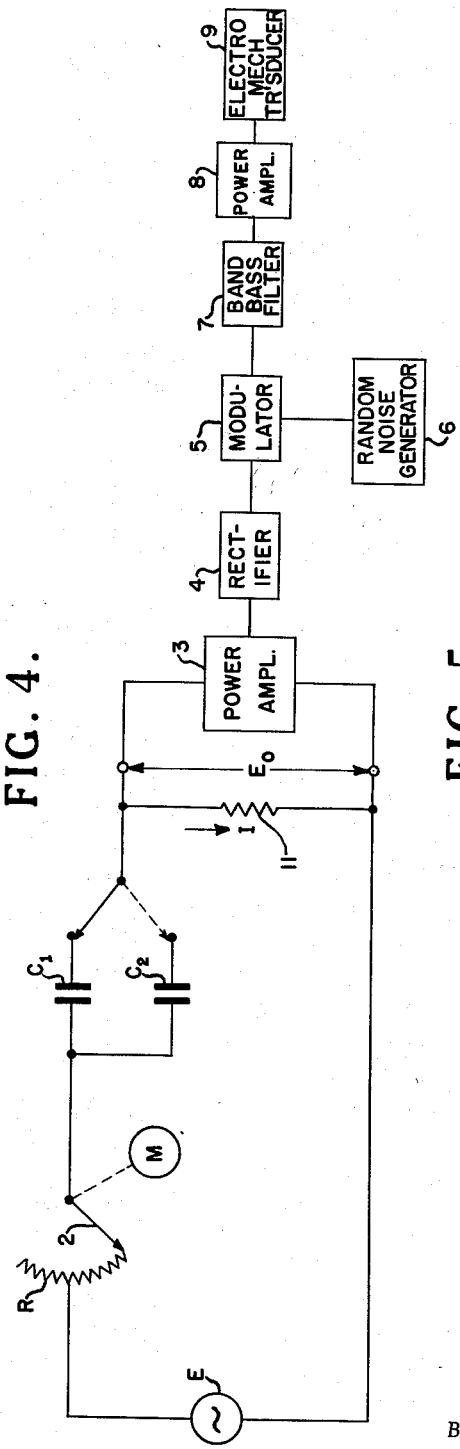
FIG. 4 shows the electrical simulator of FIG. 2 and a block diagram of a selective sound simulator.
Figure 5:
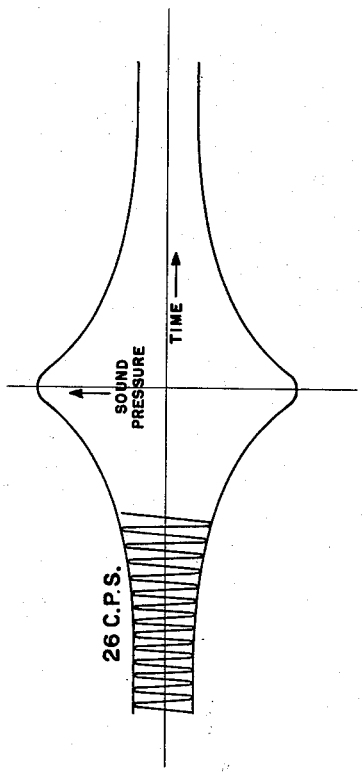
FIG. 5 is a typical wave form of the output of the electrical simulator of FIG. 2.

This formula suggests that the method of generating an analogue of the acoustic pressure signature could be approached from the alternating current voltage relationship of the circuit shown in FIGS. 2 and 4. Such an analogue could be generated by generating a voltage of constant frequency and amplitude, applying this generated voltage to a circuit in which the phase relationship of the current and voltage across the components of the circuit are employed to represent the vector components of the geometrical problem shown in FIG. 1. Considering the relationship of the current I, applied voltage E, and the impedance Z.

$$I = \frac{E}{Z} \qquad (4)$$

but $$Z = \sqrt{R^2 + X_c^2} \qquad (5)$$

where:

$X_c$ is the impedance of the capacity for a given frequency
R is the impedance offered by the resistance.

Therefore $$I = \frac{E}{\sqrt{R^2 + X_c^2}} \qquad (6)$$

This formula is very similar in form to the formula for V derived above.

From general knowledge in the field it is known that the voltage across the resistance is in phase with the current while that across the capacity is 90° out of phase with the current. It therefore appears that we can represent by voltages the vectors of the analogue distances of the signature formula thus:

Let

V correspond to I
K correspond to the applied voltage E
N, the minimum distance of approach, correspond to $X_c$
and
S correspond to R.

All the quantities on the right side of these two equations may be fixed except S, which equals $Pt$, and R. Therefore since we can vary R at the same rate as S in the signature formula, the output current will vary in a manner analogous to the signature. In practice, it is desirable to convert this current to a voltage. There is, therefore, a resistance connected across the output circuit.

The circuit to perform the operations of the method of this invention comprises a source of alternating voltage of constant amplitude E. The output of this source is connected in series with the center tap of a linear potentiometer R whose movable contact 2 is moved across the resistance element at a constant rate to continuously vary the resistance from a maximum to a minimum to a maximum in the manner of variation of the S component of the geometrical problem. Connected in series with movable contact 2 is a capacitor $C_1$ or $C_2$, depending upon the selected minimum approach distance of the sound source to the hydrophone desired. The capacity is analogous to the vector representing the minimum distance of approach in the geometrical problem of FIG. 1. A resistance 11 is connected across the voltage source to convert the current into a voltage. This voltage is applied to a rectifier 4 of conventional design. The output of the rectifier is used at 5 to modulate the output of a random noise generator 6. The resulting signal is passed through a band pass filter 7, amplified at 8 and used to drive a transducer at 9. The circuits details of elements 4 to 9 are of conventional design and do not constitute a part of the present invention.

The above described circuit could be modified by substituting an inductance for the capacity without departing from the spirit of this invention.

The closest approach of the sound source corresponds to zero resistance across the motor driven resistance 2. The time rate of change of R in ohms per second where the scale factor $\gamma$ is computed as follows:

$$\gamma = \frac{R}{PT_0} \qquad (7)$$

where:
$\gamma$ = ohms/ft. (scale factor)
$R$ = total resistance in ohms
$T_0$ = time required to traverse resistance in seconds
$P$ = the speed of sound source in feet/second.

Using the scale factor of Formula 3, the value of the reactances equivalent to the different distances of FIG. 1 is found according to the following formulae:

$$X_c = N\gamma = \frac{1}{2\pi f_c} \qquad (8)$$

$$C = \frac{1}{2\pi f X_c} \text{ (farads)} \qquad (9)$$

Applying the formulae to the vessel of FIG. 1 and desiring to express the speed in knots and capacity in microfarads:

$$\gamma = \frac{R}{1.69 P_k T_0} \text{ (ohms/ft.)} \qquad (10)$$

$$C = \frac{10^6}{2\pi f N\gamma} \text{ (microfarads)} \qquad (11)$$

where:
$P_k$ = speed in knots
$C$ = capacity in $\mu f$. (microfarads)
$f$ = c.p.s. (cycles per second)
$N$ = feet
$T_0$ = time in seconds Where the sound pressure varies inversely to the square of the distance, i.e. in air $$V = \frac{K}{D^2} \qquad (12)$$

The circuit for Equation 12 would consist of an additional resistor R and capacitance $C_1$ and $C_2$ connected in tandem with the circuit of FIG. 2, e.g. the same circuit is shown in FIG. 2 using the output $E_0$ of FIG. 2 in place of E.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A circuit for generating electrical analogue for an acoustic pressure signature of a passing sound source comprising an A.C. voltage source having a predetermined constant frequency and voltage, a pair of output terminals for said circuit, one of said terminals being connected to said A.C. source, a series impedance composed of a linear resistance and a reactance connected between said source and the other of said output terminals for varying the resistance at a constant rate from a predetermined maximum through a predetermined minimum to a second predetermined maximum to produce an envelope of said A.C. voltage whereby a current varying in amplitude is produced analogous to the envelope of the acoustic pressure signature of a passing sound source and means connected to said output terminals for converting the current to a corresponding voltage.

2. A device for generating an electrical analog for the acoustic pressure signature of a passing sound source comprising a circuit including an A.C. voltage source at a predetermined constant frequency and voltage, a pair of output terminals for said circuit, a series impedance composed of a linear resistance and a reactance connected between said source and one of said output terminals, the other of said terminals being connected to said A.C. voltage source means for varying the resistance at a constant rate from a predetermined maximum through a predetermined minimum to a second predetermined maximum to provide an envelope of said A.C. voltage, whereby to provide a current flow in said circuit varying in amplitude in the manner analogous to the acoustic pressure signature of a passing sound source of constant amplitude, and means connected across the output terminals for providing a voltage output signal correlative to the flow of the current in said impedance circuit.

3. The generator as set forth in claim 2 wherein said reactance comprises a plurality of elements in parallel having different reactance values and selective switching means for selecting a reactance element of a desired value.

4. The generator as recited in claim 2 wherein the reactance element comprises at least one condenser having a predetermined reactance for providing a predetermined maximum amplitude output signal.

5. A circuit for generating a signal simulating the noise of a passing sound source comprising; an A.C. voltage source having a predetermined constant frequency and voltage, a series impedance having a reactance element and a resistance element, connected in series with said source, said resistance element having a center tap connected to said source and a variable tap connected to said reactance element, means for driving said variable tap linearly and directly with time from a predetermined point on one side of the resistance element center tap to a predetermined point on the other side of said center tap to produce a varying output current, means connected across the source and said impedance for providing a voltage output from said circuit, a random noise generator, means connected across said driving means and to said random noise generator for modulating said signal from the random noise generator by the output of the varying voltage signal, and transducer means connected to said modulating means for converting said modulated signal to an audible signal similar in amplitude and frequency to the noise of the passing sound source.

6. A generator for producing audibly the analog of a passing sound source, comprising an A.C. voltage source having a predetermined constant frequency and voltage, a series impedance circuit having a reactance element and resistance element, said resistance element having a center tap connected to said A.C. voltage source and a motor driven variable tap connected to said reactance element, said variable tap being driven across the resistance element linearly and directly with time from a predetermined point on one side of the resistance element center tap to a predetermined point on the other side of the resistance element center tap to produce varying amplitude current signal analogous to the varying amplitude of the noise of the passing sound source, means for generating a noise signal of varying frequency similar to the frequency of the noise of the passing sound source, means connected to receive said current signal and said noise signal for modulating said noise signal by the varying amplitude current signal, and transducer means connected to said modulating means for converting said modulating signal to an audible signal whereby the noise similar to the noise of the passing sound source is audibly reproduced.

7. A generator of the electrical analog of an acoustic signature of a passing sound source comprising; an A.C. voltage source having a predetermined constant frequency and voltage, a series impedance circuit including reactance means and a variable resistance element, said resistance element having a center tap connected in series with said source and a moveable contact connected to said reactance means, means connected between said voltage source and said reactance means for deriving a voltage output, means connected to said moveable contact for driving the contact linearly and directly with time from a predetermined point on one side of the center tap to a predetermined point on the other side of said center tap, thereby to vary the output voltage in amplitude to produce said electrical analog.

8. The generator as set forth in claim 7 wherein the reactance means is adjustable to a plurality of predetermined valves thereby to vary the output signal according to the distances of the different moving sound sources.

References Cited by the Examiner

UNITED STATES PATENTS

| | | | |
|---|---|---|---|
| 2,037,202 | 4/36 | Terman | 332—52 |
| 2,055,736 | 9/36 | Terman | 332—56 |
| 2,142,580 | 1/39 | Williams | 84—1.25 |
| 2,507,890 | 5/50 | Crowther | 235—61 |
| 2,605,556 | 8/52 | Jones | 35—10.4 |

NEIL C. READ, *Primary Examiner.*

NORMAN H. EVANS, FREDERICK M. STRADER,
*Examiners.*